United States Patent
Pendleton et al.

(10) Patent No.: US 7,069,965 B2
(45) Date of Patent: Jul. 4, 2006

(54) DROP TUBE INSERTS AND APPARATUS ADAPTED FOR USE WITH A RISER PIPE

(75) Inventors: David R. Pendleton, Fairfield, OH (US); James E. Kesterman, Cincinnati, OH (US); Kristopher A. Kane, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/836,978

(22) Filed: Apr. 30, 2004

(65) Prior Publication Data

US 2005/0241723 A1    Nov. 3, 2005

(51) Int. Cl.
B65B 1/04    (2006.01)
(52) U.S. Cl. .......................... 141/88; 141/86
(58) Field of Classification Search ............ 141/86–88, 141/311 A; 220/571; 405/52, 53, 128, 129, 405/128.1, 129.1
See application file for complete search history.

(56) References Cited

U.S. PATENT DOCUMENTS

| | | | |
|---|---|---|---|
| 979,819 A | 12/1910 | Anderson | |
| 1,219,222 A | 3/1917 | Baxter et al. | |
| 1,246,033 A | 11/1917 | Adams | |
| 1,268,947 A | 6/1918 | Fell | |
| 1,289,490 A | 12/1918 | Lundstrom | |
| 1,313,386 A | 8/1919 | Jones | |
| 1,689,066 A | 10/1928 | Baxter | |
| 2,340,936 A | 2/1944 | Cook | |
| 2,499,409 A | 3/1950 | Norway | |
| 2,507,545 A | 11/1950 | Samiran | |
| 2,685,891 A | 8/1954 | Segelhorst et al. | |
| 2,811,179 A | 10/1957 | Greenwood | |
| 2,839,082 A | 6/1958 | Moore et al. | |
| 2,918,931 A | 12/1959 | Siri | |
| 2,918,932 A | 12/1959 | Few | |
| 3,078,867 A | 2/1963 | McGillis et al. | |
| 3,610,273 A | 10/1971 | Russell | |
| 3,661,175 A | 5/1972 | Tillman | |
| 3,791,407 A | 2/1974 | Nicholls | |
| 3,794,077 A | 2/1974 | Fanshier | |
| 3,963,041 A | 6/1976 | McGillis | |
| 4,308,894 A | 1/1982 | Carpentier | |
| 4,479,669 A | 10/1984 | Hynes | |
| 4,667,711 A | 5/1987 | Draft | |
| 4,793,387 A | 12/1988 | LeBlanc et al. | |
| 4,896,705 A * | 1/1990 | Podgers et al. ............... | 141/86 |
| 4,986,320 A | 1/1991 | Kesterman et al. | |

(Continued)

FOREIGN PATENT DOCUMENTS

FR        1360869        4/1964

(Continued)

OTHER PUBLICATIONS

European Search Report for App. No. 05009175 dated Aug. 5, 2005.

(Continued)

*Primary Examiner*—Timothy L. Maust
(74) *Attorney, Agent, or Firm*—Dinsmore & Shohl LLP

(57) ABSTRACT

Drop tube inserts and apparatus adapted for use with a riser pipe of a liquid reservoir are provided. Apparatus include a drop tube insert at least partially disposed within an end portion of a drop tube. The drop tube insert includes a wall with inner and outer surfaces wherein the wall of the drop tube insert is devoid of any opening extending between its inner and outer surfaces.

21 Claims, 7 Drawing Sheets

U.S. PATENT DOCUMENTS

| | | |
|---|---|---|
| 5,117,877 A | 6/1992 | Sharp |
| 6,267,156 B1 | 7/2001 | Argandona |
| 6,523,581 B1 | 2/2003 | Pendleton et al. |
| 6,655,418 B1 * | 12/2003 | McGill et al. .................. 141/1 |
| 2002/0179178 A1 | 12/2002 | Pendleton et al. |

FOREIGN PATENT DOCUMENTS

| | | |
|---|---|---|
| FR | 2194908 | 3/1974 |
| FR | 2205166 | 5/1974 |
| FR | 2270198 | 12/1975 |
| FR | 2331732 | 6/1977 |
| FR | 2355736 | 1/1978 |
| GB | 0966842 | 8/1964 |
| GB | 1444260 | 7/1976 |
| GB | 1531083 | 1/1978 |

OTHER PUBLICATIONS

*OPW Instructions*—Assembly and Installation Instructions for OPW 61-SO and 61-SOM Carb Required Overfill Prevention Valves; pp. 1-11; Jan. 1993.

*Polymod® Elastomer Sealing Materials*, Chris M.A. Chilson, Jun. 15, 2000.

*Parker Total Sealing Systems*, Parker Seal Group, Irvine, CA, 1989.

*Parker PolyPak Seals*.

* cited by examiner

DROP TUBE INSERTS AND APPARATUS ADAPTED FOR USE WITH A RISER PIPE

TECHNICAL FIELD

The present invention relates generally drop tube inserts and apparatus, and more specifically to drop tube inserts and apparatus adapted for use with a riser pipe of a liquid reservoir.

BACKGROUND OF THE INVENTION

Our increasingly mobile and mechanized society uses a variety of different fuels (e.g., gasoline, diesel fuel, ethanol, etc.) as energy. Liquid fuels are generally stored in liquid reservoirs such as underground storage tanks, above ground tanks, or any of a variety of different containers. Typically, liquid fuel reservoirs have inlets and outlets through which fuel can be added to and/or removed from the reservoir. These inlets and outlets may typically consist of a riser pipe extending from the reservoir. Internal to the riser pipe is a drop tube and the space between the riser pipe and the drop tube is frequently referred to as the interstitial space between the riser pipe and the drop tube. The riser pipe is typically threaded to an adapter collar to which a fuel line can be coupled. A spill container surrounds the fill adapter collar and acts as a secondary containment system for any overflow or spillage that may occur during the filling process.

Such configurations have proven to be very effective, however, the interstitial space between the riser pipe and the drop tube can allow an excessive amount of vapor to be introduced into the atmosphere, especially during the filling process. For example, the interstitial space can act as a chimney for vapor to be released from the ullage of the tank. Though the interstitial space area is relatively small, because of this chimney effect, the vapor from the entire ullage area of the reservoir can be released through the interstitial space and may therefore create an environmental concern. As exemplified by the disclosure of U.S. Pat. No. 6,523,581, there is a continuing desire to provide apparatus and methods for minimizing, such as preventing, release of vapors from an ullage area of the reservoir.

SUMMARY OF THE INVENTION

Accordingly, it is an object of the present invention to obviate problems and shortcomings of conventional liquid reservoirs. More particularly, it is an object of the present invention to provide liquid reservoirs and components thereof that minimize or prevent vapor release from an ullage area of a liquid reservoir.

To achieve the foregoing and other aspects and in accordance with the present invention, an apparatus adapted for use with a riser pipe of a liquid reservoir is provided. The apparatus includes a drop tube adapted for at least partial disposition in a riser pipe of a liquid reservoir. The drop tube includes a wall with inner and outer surfaces. The apparatus further includes a drop tube insert at least partially disposed within an end portion of the drop tube. The drop tube insert includes a wall with inner and outer surfaces wherein at least portions of the inner surfaces of the drop tube and drop tube insert cooperate to define a liquid flow path. The wall of the drop tube insert is devoid of any opening extending between its inner and outer surfaces. The apparatus further includes an interstitial space interposed between at least portions of the outer surface of the drop tube insert and the inner surface of the drop tube and a fastener extending through the wall of the drop tube and the interstitial space to engage the drop tube insert and to secure the drop tube insert relative to the drop tube. The apparatus also includes a first sealing member positioned between the outer surface of the drop tube insert and the inner surface of the drop tube. The first sealing member is operative to inhibit fluid communication between the interstitial space and the liquid flow path.

To achieve further aspects and in accordance with the present invention, a drop tube insert is provided that is adapted to be at least partially inserted into an interior area of a drop tube. The drop tube insert includes a wall with an inner surface, an outer surface, a first end portion, and a second end portion. The first end portion comprises a flared portion including a circumferential sealing surface for a sealing member. The outer surface includes at least one cavity that is adapted to receive a fastener. The wall of the drop tube insert is devoid of any openings extending between its inner and outer surfaces.

To achieve still further aspects and in accordance with the present invention, a liquid communication assembly is provided that is adapted for use with a liquid reservoir. The assembly includes a spill restrictor, a riser pipe including a restrictor end and an inwardly facing surface. The riser pipe is attached to the spill restrictor at the restrictor end. The assembly further includes a drop tube at least partially disposed in the riser pipe, wherein the drop tube includes a wall with an inner surface and an outer surface. Still further, the assembly includes a drop tube insert at least partially disposed within an end portion of the drop tube. The drop tube insert includes a wall with inner and outer surfaces. At least portions of the inner surfaces of the drop tube and drop tube insert cooperate to define a liquid flow path. The wall of the drop tube insert is devoid of any opening extending between its inner and outer surfaces. The assembly also includes an interstitial space interposed between at least portions of the outer surface of the drop tube insert and the inner surface of the drop tube and a fastener that extends through the wall of the drop tube and the interstitial space to engage the drop tube insert and to secure the drop tube insert relative to the drop tube. The assembly still further includes a first sealing member positioned between the outer surface of the drop tube insert and the inner surface of the drop tube. The first sealing member is operative to inhibit fluid communication between the interstitial space and the liquid flow path. The assembly also includes a second sealing member engaging the restrictor end of the riser pipe and a portion of the drop tube insert.

Advantages and novel features of the present invention will become apparent to those skilled in the art from the following detailed description, which simply illustrates various modes and examples contemplated for carrying out the invention. As will be realized, the invention is capable of other different aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

DETAILED DESCRIPTION OF EXEMPLARY EMBODIMENTS

Reference will now be made in detail to various exemplary embodiments of the invention, concepts of which are illustrated in the accompanying drawings, wherein like numerals indicate the same elements throughout the views.

Figure 1:
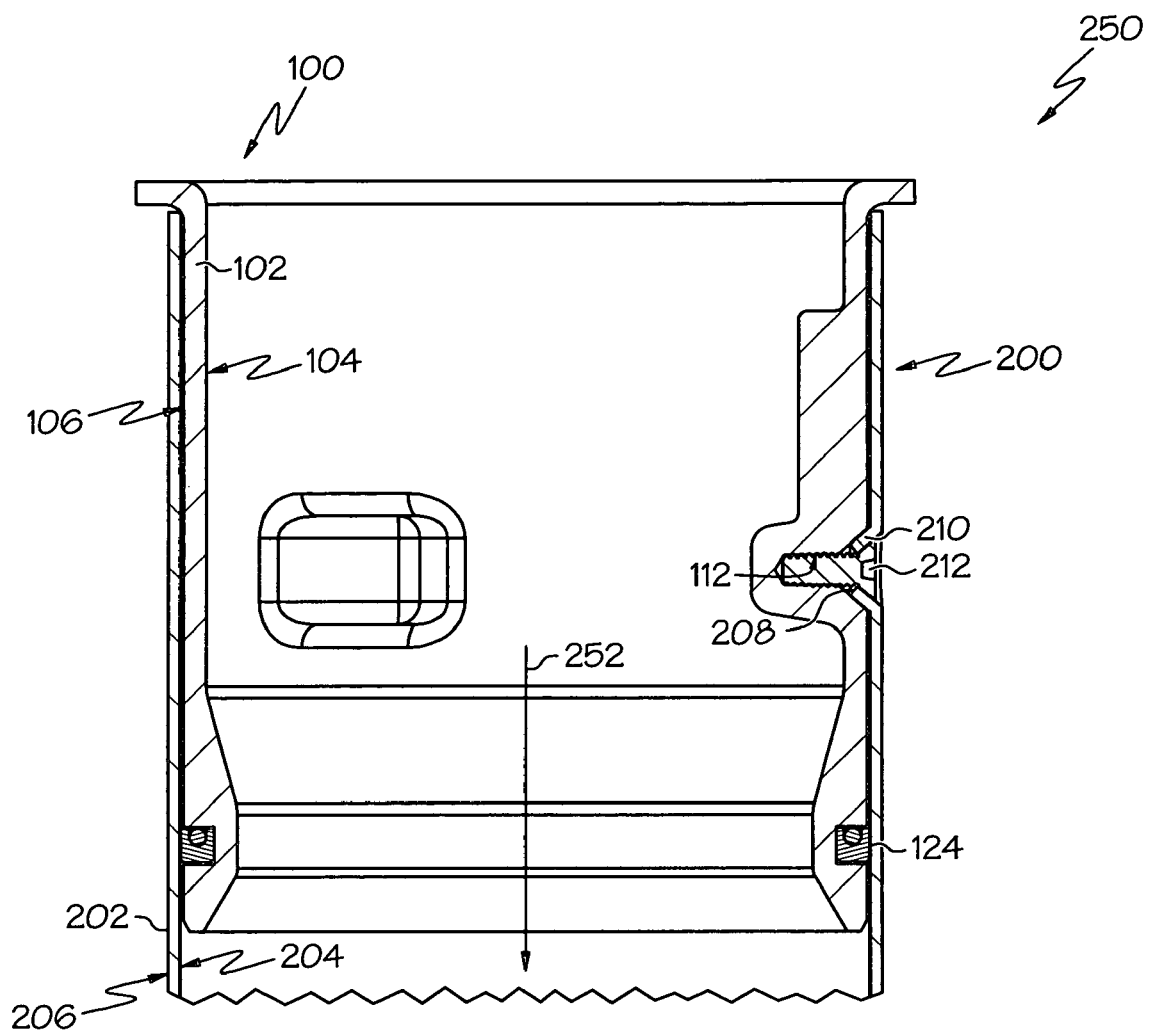
FIG. 1 is a cross sectional view of an apparatus for use with a riser pipe of a liquid reservoir in accordance with one exemplary embodiment of the present invention.
Figure 9:
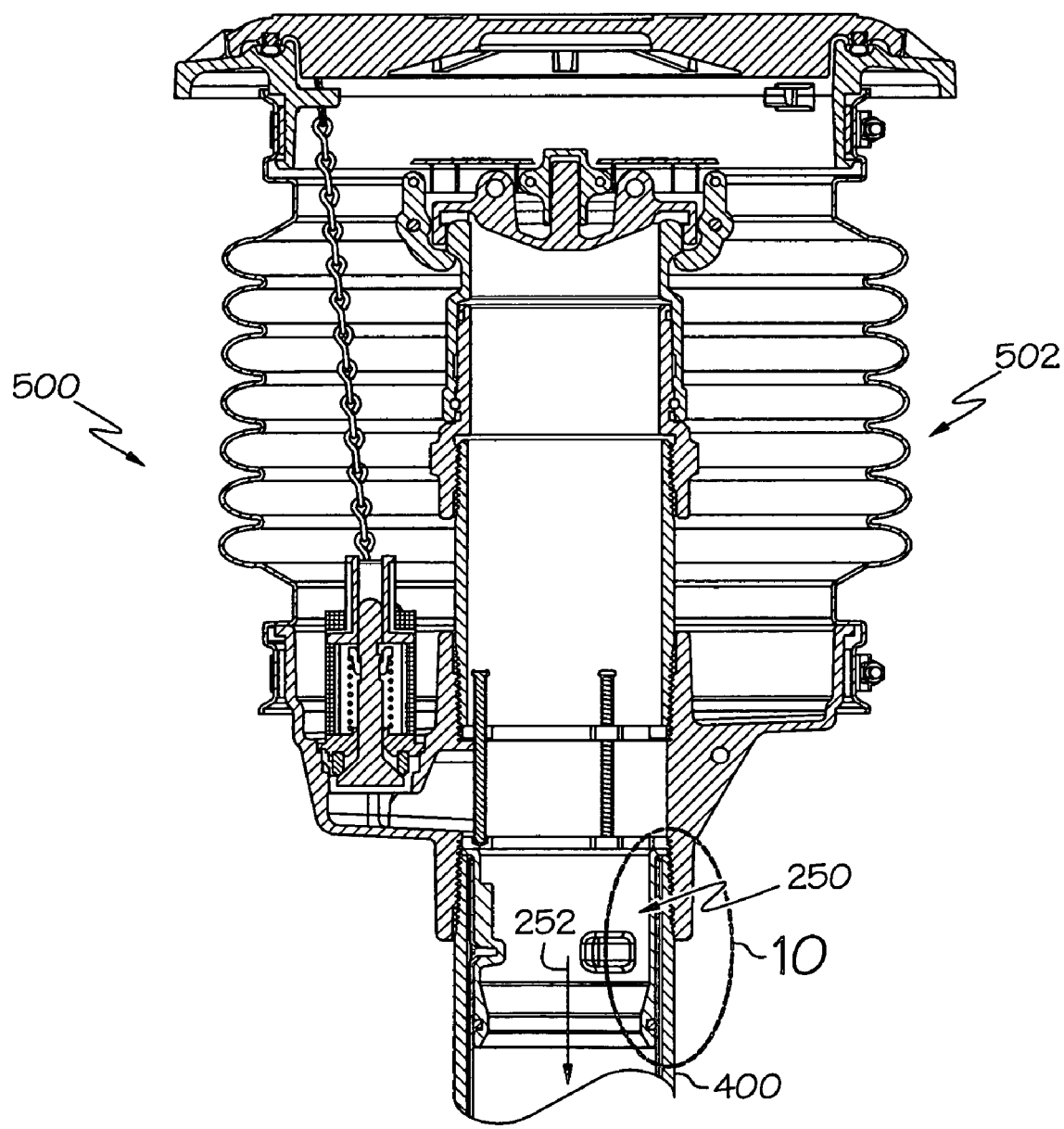
FIG. 9 illustrates a liquid communication assembly in accordance with exemplary embodiments of the present invention.

FIG. 1 depicts an exemplary apparatus 250 for use with a riser pipe of a liquid reservoir, such as a liquid storage tank. As shown, the apparatus 250 includes a drop tube 200 adapted for at least partial disposition in a riser pipe 400 (see FIG. 9) of a liquid reservoir. The drop tube 200 includes a wall 202 with an inner surface 204 and an outer surface 206. The wall 202 can take many shapes in accordance with the concepts of the present invention. For example, the wall 202 can include circular and/or noncircular cross sectional shapes. In particular examples, and as shown in the drawings, the wall may comprise a cylinder with a cylindrical wall wherein the inner surface 204 comprises an inner cylindrical surface and the outer surface 206 comprises an outer cylindrical surface.

The drop tube 200 can be formed from a wide range of materials and can include materials that will not degrade when exposed to liquid being contained in an associated liquid reservoir. For example, the drop tube 200 may be formed from materials that will not degrade when exposed to hydrocarbon liquids, slurries, or the like. Exemplary materials may include plastic, metal (e.g., aluminum), or the like.

The apparatus 250 further includes a drop tube insert 100 at least partially disposed within an end portion of the drop tube 200. Although the drop tube insert 100 is shown as inserted partially within an end portion of the drop tube 200, in alternative embodiments the drop tube insert 100 may be inserted entirely into an interior area of the drop tube 200. The drop tube insert 100 includes a wall 102 with an inner surface 104 and an outer surface 106. At least portions of the inner surfaces 104, 204 of the drop tube insert 100 and drop tube 200 cooperate to define a liquid flow path 252.

The wall 102 of the drop tube insert 100 can take a variety of shapes that may correspond to a shape of an interior portion of the drop tube 200. For example, the wall 102 can include circular and/or noncircular cross sectional shapes. In particular examples, and as shown in the drawings, the wall 102 may comprise a cylinder wherein the wall 102 comprises a cylindrical wall, the inner surface 104 comprises an inner cylindrical surface and the outer surface 106 comprises an outer cylindrical surface.

The drop tube insert 100 can also be formed from a wide range of materials and can include materials that will not degrade when exposed to liquid being contained in an associated liquid reservoir. For example, the drop tube insert 100 may be formed from materials that will not degrade when exposed to hydrocarbon liquids, slurries, or the like. Exemplary materials may include plastic, metal (e.g., aluminum), or the like.

Figure 4:
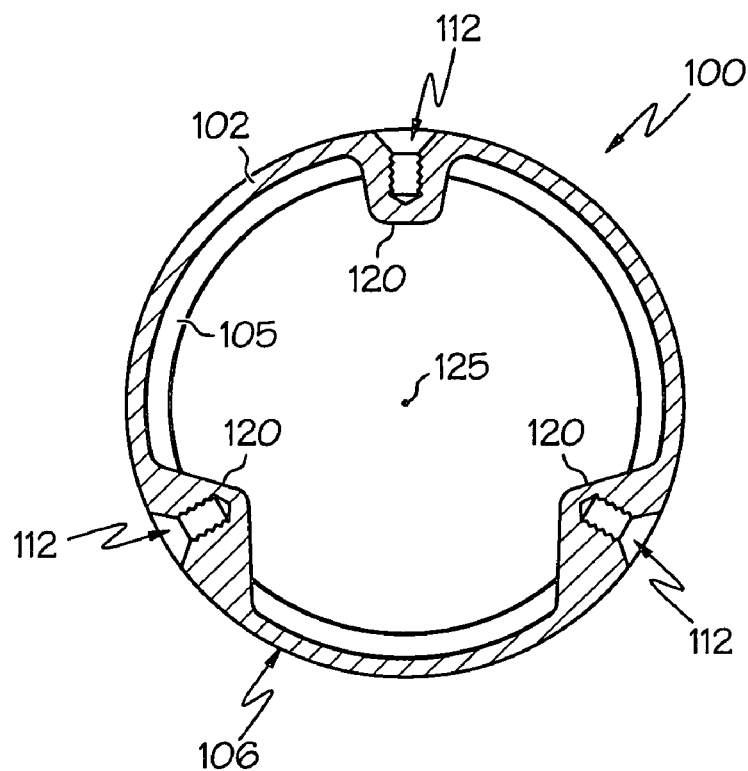
FIG. 4 is a sectional view of the drop tube insert along line 4—4 of FIG. 3.
Figure 5:
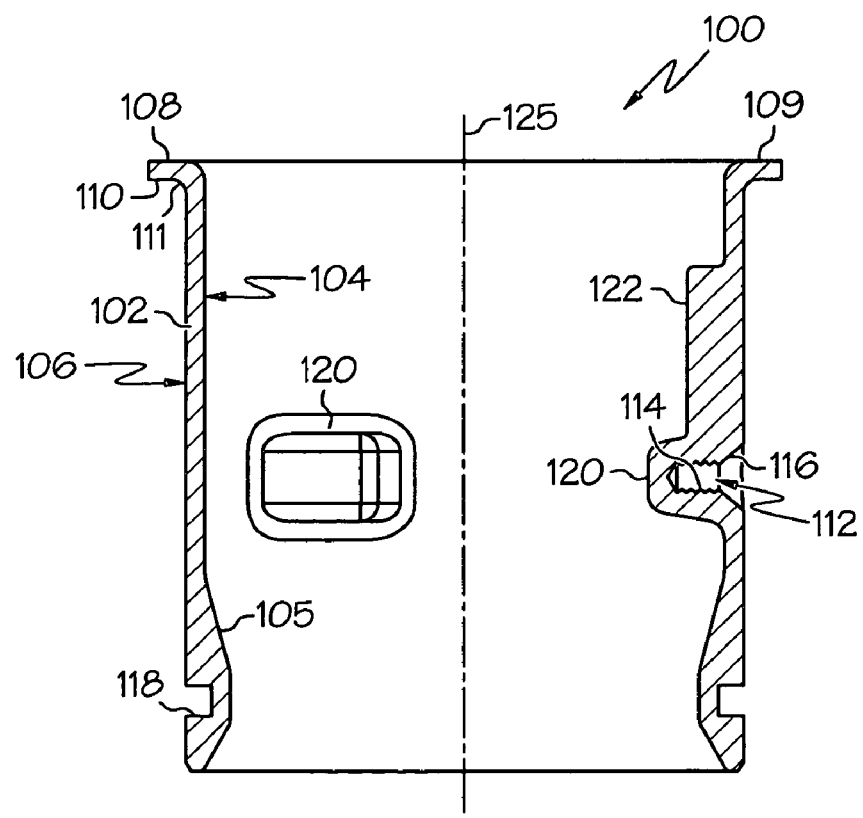
FIG. 5 is a sectional view of the drop tube insert along line 5—5 of FIG. 3.
Figure 8:
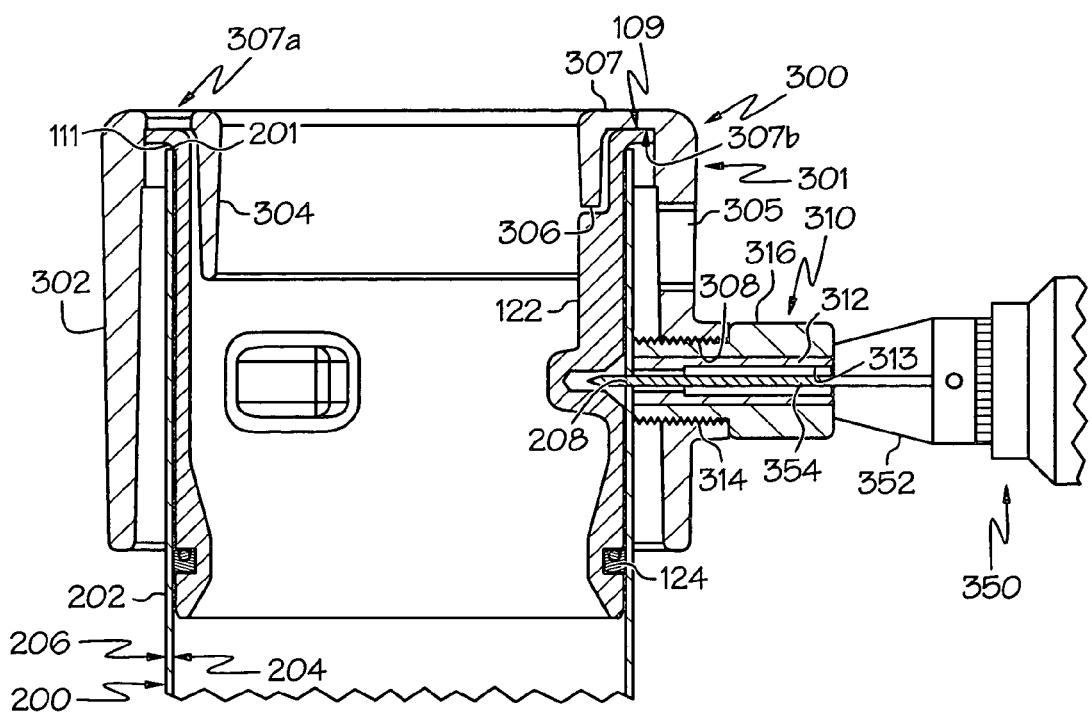
FIG. 8 illustrates a sectional view of the exemplary system and portions of the drill taken along line 8—8 of FIG. 7.

The wall 102 of the drop tube insert 100 is devoid of any opening extending between its inner and outer surfaces. For example, as best shown in FIGS. 4 and 5, the drop tube insert 100 might include at least one cavity 112 in the outer surface 106 of the drop tube insert 100. The at least one cavity 112, if provided, may be adapted to receive a fastener 212 and/or may be adapted to receive a crimped portion 210 of the drop tube 200 as shown in FIG. 1. The cavity 112, if provided, can optionally include a threaded portion 114 adapted to receive the threaded shank of a fastener 212 and a countersunk portion 116 adapted to receive the head of the fastener 212 and a crimped portion 210 of the drop tube 200. As shown in FIG. 1, for example, the fastener 212 engages both the cavity 112 and the crimped portion 210 to provide a particularly strong connection between the drop tube insert 100 and the drop tube 200. As shown in FIGS. 4 and 5, the apertures may be initially threaded to later receive the threaded portion of a threaded fastener. In alternative embodiments, the apertures may be initially nonthreaded (e.g., as shown in FIG. 8) and threads may be later cut into the cavity wall by a threaded portion of a fastener as the fastener is tightened. Further exemplary cavities might not include a threaded portion. Fasteners in these applications, might comprise a rivet or other fastener adapted to engage a non-threaded cavity.

Although not shown, exemplary embodiments of the drop tube insert 100 may be provided without any cavities in the outer surface 106 of the drop tube insert 100. Providing the drop tube insert 100 without cavities may simplify fabrication and/or reduce material costs by eliminating the necessity of providing an area of increased wall thickness 120 to accommodate the cavity, eliminate the necessity of forming the cavities 112, and simplify formation of corresponding apertures in the drop tube 200. In embodiments without cavities, for example, fasteners may be provided that act as set screws and/or the drop tube 200 may be crimped in place with respect to the drop tube insert with or without accompanying fasteners. Providing cavities, however, may be desirable in particular applications where a particularly strong connection is desirable and can be obtained by the fastener connection and/or crimping a portion of the drop tube 200 into a portion of the cavity 112.

Figure 10:
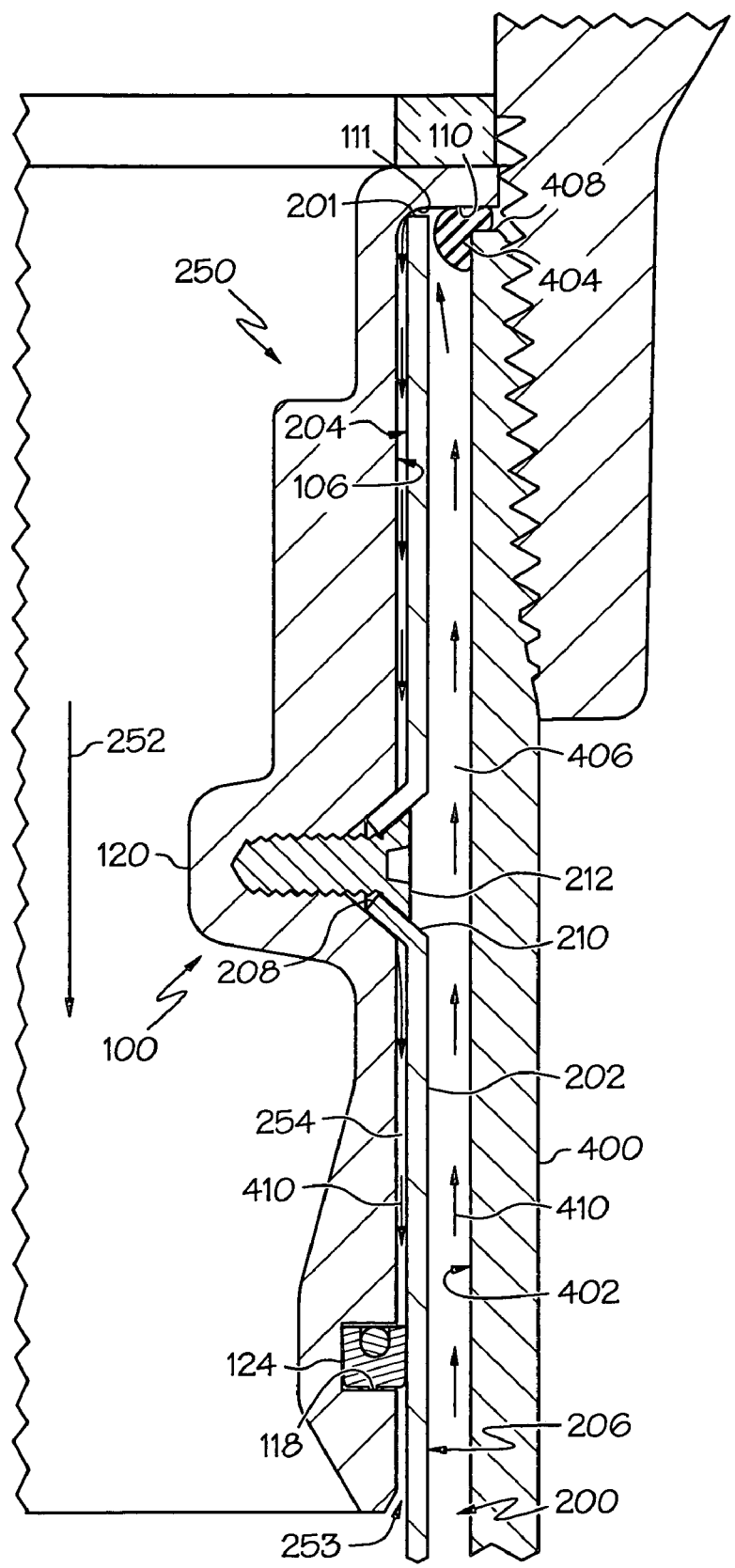
FIG. 10 illustrates an enlarged view of the liquid communication assembly taken at view 10 of FIG. 9.

As best shown in FIG. 10, once the drop tube insert 100 is at least partially disposed within an end portion of the drop tube 200, an interstitial space 254 is interposed between at least portions of the outer surface 106 of the drop tube insert 100 and the inner surface 204 of the drop tube 200. The interstitial space 254 may result from a clearance between inner dimensions of the drop tube 200 and outer dimensions of the drop tube insert 100. The interstitial space 254 may also result from surface imperfections in the inner surface 204 of the drop tube 200 and/or the outer surface 106 of the drop tube insert 100. Although not shown, the distance between the inner surface 204 of the drop tube 200 and the outer surface 106 of the drop tube insert 100 may differ throughout the interstitial space 254.

A sealing member 124 may be positioned between the outer surface 106 of the drop tube insert 100 and the inner surface 204 of the drop tube 200. As shown, the drop tube insert 100 might include a circumferential groove 118 adapted to at least partially receive the sealing member 124. The sealing member 124 can be operative to inhibit, such as prevent, fluid communication between the interstitial space 254 and the liquid flow path 252. For example, as shown in FIG. 10, the sealing member 124 can inhibit fluid communication between the interstitial space 254 and the liquid flow path 252 that might otherwise occur through area 253. Therefore, a vapor path, indicated by arrows 410 in FIG. 10, may be interrupted by the sealing member 124 to inhibit, such as prevent, introduction of vapor from the interstitial space 254 into the liquid flow path 252. A wide variety of sealing members may be incorporated with the concepts of the present invention. In the illustrated embodiment, the sealing member might comprise a PolyPak® sealing member available from Parker-Hannifin Corporation. The PolyPak® sealing member might be beneficial to provide an excellent sealing function with a wide range of clearance distances and differing clearance distances between the opposed walls of the drop tube and the drop tube insert. Moreover, the PolyPak® sealing member can provide a sufficient sealing function without the use of epoxy sealant.

Figure 2:
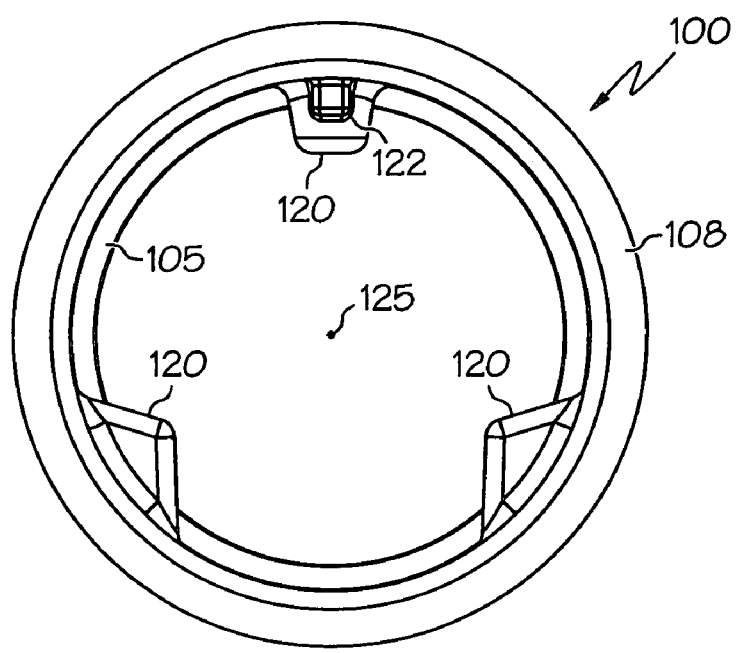
FIG. 2 is a top view of a drop tube insert from the apparatus of FIG. 1.
Figure 3:
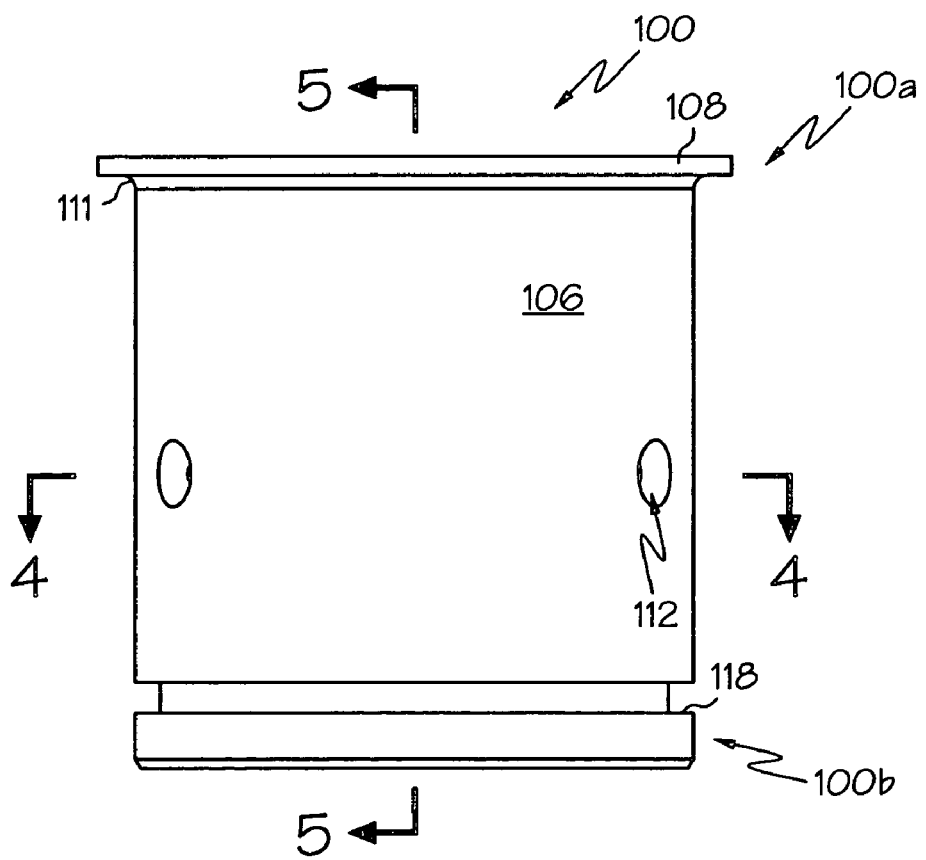
FIG. 3 is a front elevational view of the drop tube insert of FIG. 2.

While FIG. 1 depicts an exemplary drop tube insert 100 being secured to an end portion of a drop tube 200, FIGS. 2–5 illustrate particular features of the drop tube insert 100 in accordance with the illustrated exemplary embodiment. FIG. 2 is a top view while FIG. 3 is a front elevational view of the exemplary drop tube insert 100 from the apparatus of FIG. 1. FIG. 4 is a sectional view along line 4—4 of FIG. 3 and FIG. 5 is a sectional view along line 5—5 of FIG. 3.

As shown in FIG. 4 and mentioned previously, the outer surface 106 of the drop tube insert 100 can include at least one cavity 112. The at least one cavity, if provided, may include a plurality of cavities that are radially disposed about a central axis 125 of the drop tube insert 100. As best shown in FIG. 4, the at least one cavity 112 comprises three cavities that are substantially equally radially disposed about the central axis 125 of the drop tube insert 100. Although three cavities are illustrated, it is understood that more or less than three cavities may be provided in accordance with the concepts of the present invention. Still further, the cavities may not be equally radially disposed about the central axis 125. However, providing three or more cavities 112 that are equally radially disposed may facilitate a substantially consistent interstitial space 254 between the outer and inner surfaces 106, 204 at the location of the sealing member 124. Indeed, the fasteners 212 associated with the cavities 112 may provide forces that substantially counter one another. The countering forces may substantially center the drop tube insert 100 with respect to the drop tube 200 that may provide the interstitial space 254 with a desired and consistent distance between the outer and inner surfaces 106, 204 at the location of the sealing member 124. Providing a distance within a desired range and/or a substantially consistent distance within a desired range may enhance the effectiveness of the sealing member 124. Indeed, the effectiveness of sealing members are typically maximized when the distance between opposed walls to be sealed is maintained within a certain tolerance range that is acceptable for the particular sealing member in use.

As mentioned, the wall 102 is devoid of any opening extending between its inner surface 104 and its outer surface 106. For example, if one or more cavities 112 are provided in the outer surface 106, the cavity 112 is disposed in the wall 102 such that it does not extend between the inner surface 104 and outer surface 106 of the wall 102. Rather the blind end of the cavity 112 stops short of the inner surface 104, thereby avoiding fluid communication between the inner and outer surfaces 104, 106. As shown in FIG. 10, avoiding fluid communication between the inner and outer surfaces 104, 106 assists in inhibiting, such as preventing, fluid communication between the interstitial space 254 and the liquid flow path 252. To prevent the cavities 112 from extending between the inner and outer surface of the wall 102, the wall may include areas of increased wall thickness 120 at locations adjacent each corresponding cavity 112. The areas of increased wall thickness 120 may be shaped as best shown in FIGS. 2 and 4 in order to facilitate formation of the drop tube insert 100 during a molding process.

As shown in FIGS. 3 and 5, the exemplary drop tube insert 100 includes a first end portion 100a and a second end portion 10b. In the illustrated embodiment, the first end portion 100a can include a circumferential sealing surface 110 for a sealing member (e.g., see 404 in FIG. 10) and the second end portion 100b may be provided with the circumferential groove 118 to at least partially receive the sealing member 124. In the particular illustrated embodiment, the first end portion 100a may include a flared portion 108, such as a flange, that includes the circumferential sealing surface 110. The flared portion 108 may be formed by rolling, machining away portions of material, or by other fabrication processes. The circumferential sealing surface 110 may comprise a flat, rounded, and/or other surface configuration suitable for use with a corresponding sealing member. For example, as shown, the circumferential sealing surface 110 may comprise a flat surface in combination with a rounded transition portion 111. As shown in FIG. 10, the transition portion 111 may also act as an axial registration structure. For example, as shown, the transition portion 111 comprises a concave rounded portion that eventually contacts the edge 201 of the end portion of the drop tube 200 to limit insertion of the drop tube insert 100 within the end portion of the drop tube 200. Although not shown, the wall 102 of the drop tube insert 100 may alternatively include a shoulder adapted to abut the edge 201 of the end portion of the tube 200 wherein the shoulder provides an axial registration structure.

As best shown in FIG. 5, the wall 102 of the drop tube insert 100 may further include an area of increased thickness to accommodate the circumferential groove 118. Such area of increased thickness may include a streamlined ramp portion 105 designed to inhibit and/or prevent eddying and/or turbulence of liquid traveling through the liquid flow path 252. Still further, the drop tube insert 100 may include one or more registration structures that are designed to inhibit a relative movement between an alignment fixture 300 (See FIGS. 6–8) and the drop tube insert 100. The one or more registration structures of the drop tube insert 100 are designed to interact with the alignment fixture 300 in order to form one or more apertures 208 in the drop tube 200 at predetermined locations with respect to the drop tube insert 100.

In exemplary embodiments, the registration structure of the drop tube insert 100, if provided, may comprise an axial registration structure and/or an angular registration structure. For example, the drop tube insert 100 may be provided with an axial registration structure adapted to cooperate with an axial registration structure of the alignment fixture 300 to inhibit a relative axial movement between the drop tube insert 100 and the alignment fixture 300. In the illustrated embodiment, the drop tube insert 100 includes an axial registration structure comprising an upper surface 109 of the flared portion 108 while the alignment fixture 300 includes an axial registration structure comprising an inner surface 307b of the alignment fixture 300. The upper surface 109 of the flared portion 108 is adapted to abut with the inner surface 307b of the alignment fixture 300 to inhibit a relative axial movement and thereby facilitate a relative axial position of the drop tube insert 100 and the alignment fixture 300 as shown in FIG. 8.

Figure 6:
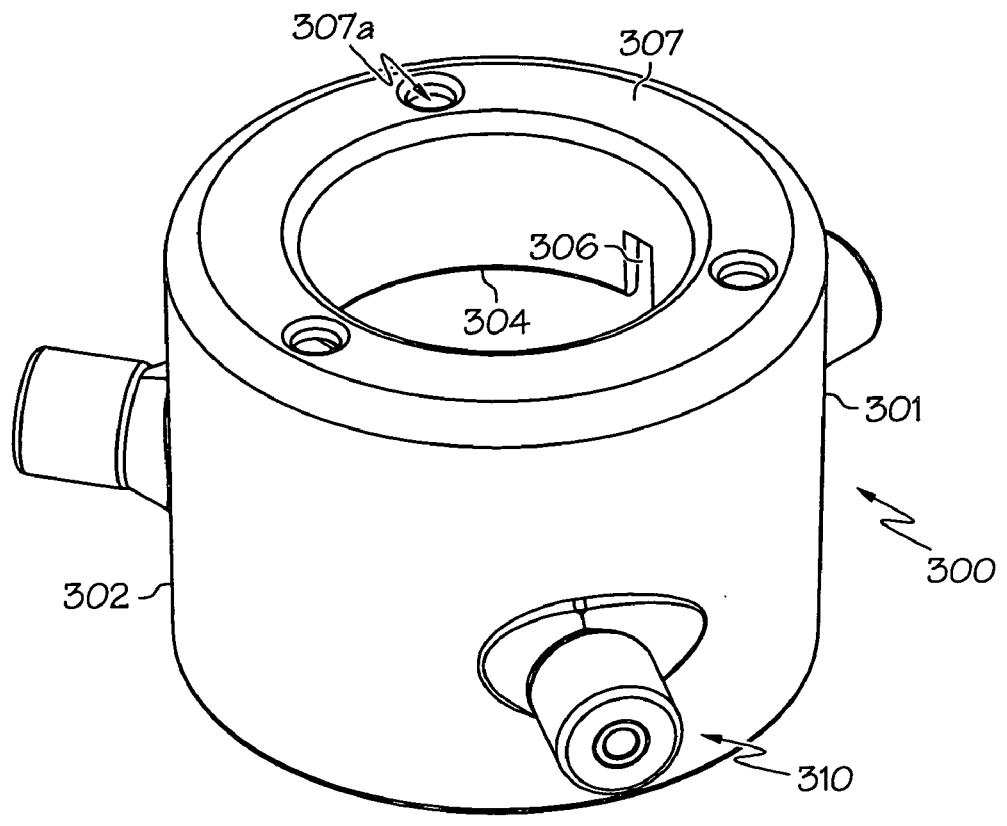
FIG. 6 illustrates a partially exploded view of an exemplary system including an alignment fixture, drop tube and drop tube insert.
Figure 6:
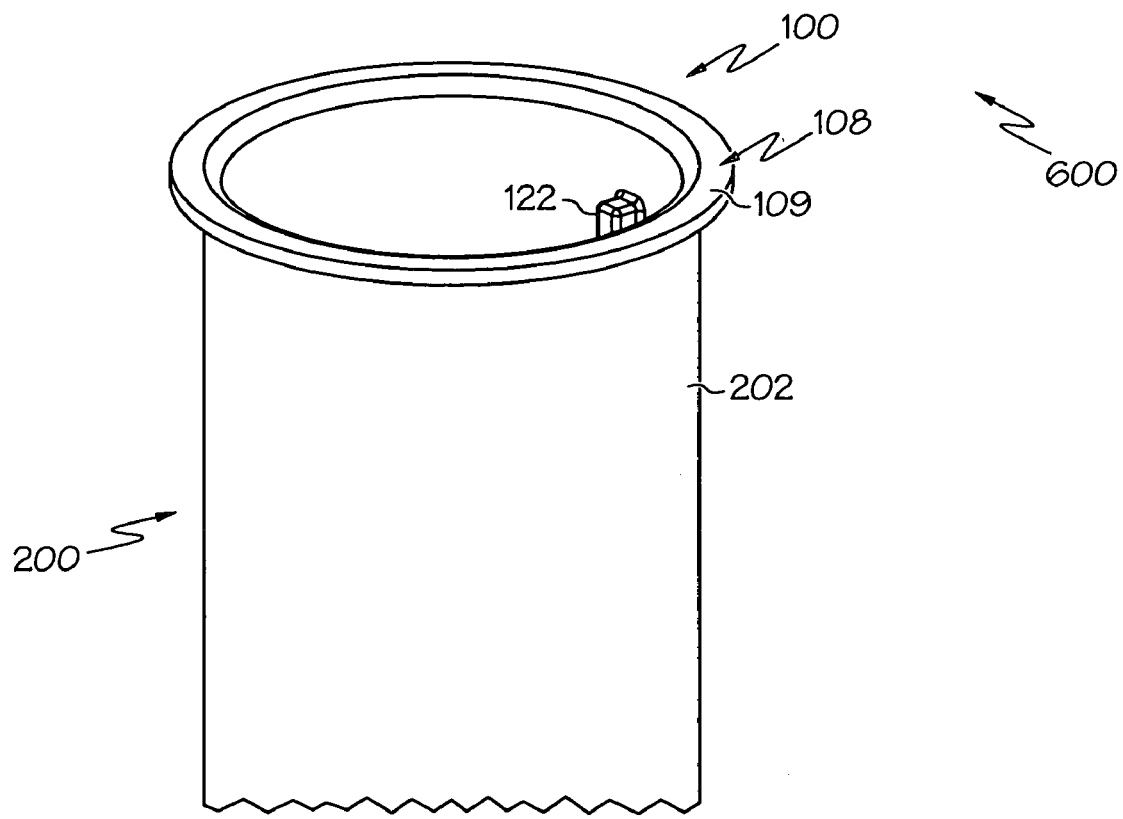

As best shown in FIGS. 2, 5 and 6, the registration structure, if provided, of the drop tube insert 100 may also comprise an angular registration structure adapted to cooperate with an angular registration structure of the alignment fixture 300 to inhibit a relative angular movement between the alignment fixture 300 and the drop tube insert 100. As shown, for example, the drop tube insert 100 includes an angular registration structure comprising a tongue 122 while the alignment fixture 300 includes an angular registration structure comprising a slot 306. The slot 306 of the alignment fixture 300 is adapted to receive the tongue 122 of the drop tube insert 100. Therefore, when positioning the alignment fixture relative to the tube insert, the slot 306 may be inserted over the tongue to inhibit, such as prevent, a relative angular movement between the alignment fixture 300 and the drop tube insert 100 and thereby facilitate a relative angular position of the drop tube insert 100 and the alignment fixture 300 as shown in FIG. 8. Rather than a slot, the angular registration structure of the alignment fixture may alternatively comprise a recess, such as a groove, adapted to receive the tongue from the tube insert.

Although not shown, the tube insert can alternatively include a slot or recess adapted to receive a tongue of the alignment fixture. In still further embodiments, the angular registration structures might comprise a pair of cooperating inclined shoulders wherein the shoulders are designed to approach one another as the alignment fixture is twisted relative to the drop tube insert until the shoulders abut one another at the desired relative angular position. Still further, the angular registration structure may also include a non-circular shape of the drop tube insert and/or the alignment fixture to facilitate the relative angular position.

In particular embodiments, the registration structure of the drop tube insert 100 may comprise a single structure that provides both an axial and an angular registration function. For example, a single tongue may function as an axial stop while also providing an angular registration function.

The alignment fixture 300 and its application will now be discussed in more detail with reference to FIGS. 6–8. FIG. 6 depicts an exemplary system 600 adapted to cooperate with a drill 350 (see FIGS. 7 and 8). The exemplary system 600 comprises the drop tube insert 100, the drop tube 200, and the alignment fixture 300.

As shown, the drop tube insert 100 is at least partially disposed within an end portion of the drop tube 200. The drop tube insert 100 may slide downward with respect to the drop tube 200 until the transition portion 111, acting as an axial registration structure, abuts against the edge 201 of the end portion of the drop tube 200 (see FIG. 8). Once in position, the at least one cavity 112 of the drop tube insert 100 is hidden behind the wall 202 of the drop tube 200 in instances where the drop tube wall 202 is opaque (see FIG. 6). In applications where one or more cavities 112 are hidden, the alignment fixture 300 may be provided to assist in forming apertures in the drop tube wall 202 that are each aligned with a corresponding one of the cavities 112 of the drop tube insert 100.

As discussed above, the alignment fixture 300 may include one or more registration structures to inhibit a relative movement between the alignment fixture 300 and the drop tube insert 100. For example, as previously mentioned, the alignment fixture 300 can include an angular registration structure comprising a slot 306 adapted to cooperate with an angular registration structure comprising a tongue 122 of the drop tube insert 100 to inhibit relative angular movement between the alignment fixture 300 and the drop tube insert 100. As discussed with respect to the drop tube insert 100, the angular registration structure of the alignment fixture 300 can take a variety of alternative forms to inhibit a relative angular movement between the alignment fixture 300 and the drop tube insert 100.

Alternatively, or in addition, the one or more registration structures of the alignment fixture 300 may comprise an axial registration structure to inhibit a relative axial movement between the alignment fixture 300 and the drop tube insert 100. As discussed above, the axial registration structure, if provided, may comprise an inner surface 307b of a bridge flange 307. In this embodiment, the inner surface 307b of the bridge flange 307 is adapted to abut the upper surface 109 of the flared portion 108 of the drop tube insert 100 to act as a stop and thereby inhibit a relative axial movement between the alignment fixture 300 and the drop tube insert 100. Providing the inner surface 307b as an axial stop allows substantially continuous contact with the upper surface 109 about the periphery of the drop tube insert 100 to provide appropriate axial registration at each point about the periphery of the alignment fixture 300. The bridge flange 307 also includes a plurality of view ports 307a, e.g., apertures, that permit observation of a relative axial orientation between the alignment fixture 300 and the drop tube insert 100.

The alignment fixture 300 also includes a plurality of alignment devices 310 adapted to receive a drill bit 354 of a drill 350 for forming the one or more apertures 208 through the wall 202 of the drop tube 200. The alignment fixture 300 includes a body portion 301 wherein the alignment device 310 is adjustably mounted to the body portion 301. Indeed, as shown in the body portion 301 includes a mounting aperture 308 wherein at least a portion of the alignment device 310 is adapted to adjustably engage the mounting aperture 308. Providing adjustability between the alignment device 310 and the body portion 301 can introduce many advantages to the alignment fixture 300. For example, as shown, the adjustability of the alignment device 310 with respect to the body portion 301 may provide an alignment device 310 that is adapted to clamp the alignment fixture 300 to the drop tube 200 to thereby inhibit relative axial and angular rotation between the alignment fixture 300 and the drop tube insert 200. Moreover, providing three or more adjustable alignment devices 310, as best shown in FIGS. 6 and 7, allows the alignment fixture 300 to be mounted such that it is appropriately centered with respect to the drop tube insert 100 and the drop tube 200. In still further examples, and as shown, the alignment devices 310 may be removable from the corresponding mounting apertures 308. Removability of the alignment devices 310 from the mounting apertures 308 permits replacement or facilitates repair of worn alignment devices 310 without replacing the entire mounting fixture 300.

Adjustability between the mounting device 310 and the body portion 301 is achieved by providing the alignment device 310 with a threaded shaft 314 adapted to adjustably engage a threaded mounting aperture 308 of the body portion 301. An exterior surface 316 of the alignment devices 310 may be knurled or otherwise provided with a gripping surface to facilitate tightening of the alignment devices 310 in use. To perform a clamping function, each of the alignment devices 310 can be incrementally rotated to provide a centering function while sufficiently clamping the alignment fixture 300 relative to the drop tube 200 to substantially inhibit, such as prevent, relative axial and angular rotation therebetween.

The alignment devices 310 further includes an elongated alignment aperture 313 adapted to align the drill bit 354 of the drill 350 with respect to a location on the drop tube 200 where the corresponding aperture 208 is to be formed. The alignment device 310 also includes a drill bit guard 312, such as a hardened steel bushing, adapted to facilitate an alignment function while protecting the remaining portions of the alignment device 310 from damage by the drill bit 354 of the drill 350. The drill bit guard 312 may be particularly useful in applications where the alignment device 310 is otherwise formed from a relatively soft material, such as aluminum, plastics or the like.

Figure 7:
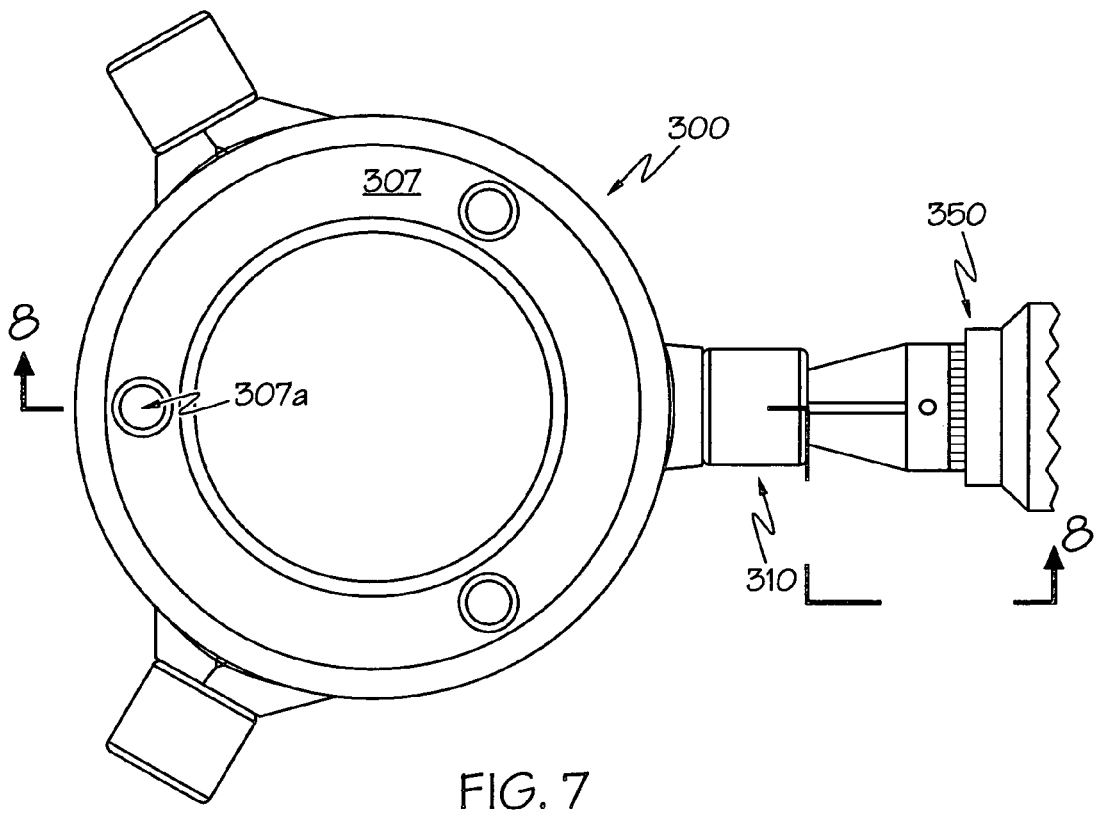
FIG. 7 illustrates a top view of the exemplary system of FIG. 6 and portions of a drill.

The body portion 301 of the alignment fixture 300, as shown in FIGS. 6-8, includes an outer flange 302, an inner flange 304 spaced from the outer flange 302 and a bridge flange 307 attached between the outer flange 302 and the inner flange 304. The outer flange 302, inner flange 304 and bridge flange 307 comprise substantially continuous walls in order to provide a substantially rigid and durable structure capable of performing the alignment function.

As best shown in FIG. 8, the alignment device 310 is mounted to the outer flange 302, the inner flange 304 comprises the previously-mentioned angular registration structure, e.g., the slot 306, while the bridge flange 307 provides the previously-mentioned view ports 307a, e.g., apertures, and axial registration structure, e.g., the inner surface 307b of the bridge flange 307. The outer flange 302 may also include an access window 305 to permit entry of a cutting tool and thereby facilitate formation of the slot 306 when fabricating the alignment fixture 300.

An exemplary method of securing a tube insert with at least one cavity and being devoid of any openings extending through its inner and outer surfaces to an end portion of a tube will now be described with reference to FIGS. 6-8. An installer is first provided with a drop tube 200 including an end portion and a wall 202 with an inner surface 204 and an outer surface 206. The installer is further provided with a drop tube insert 100 including a registration structure and a wall 102 with an inner surface 104 and an outer surface 106. The wall 102 of the drop tube insert 100 is provided with at least one cavity 112 in the outer surface 106 of the drop tube insert 100. The wall 102 of the drop tube insert 100 is also devoid of any openings extending through its inner and outer surfaces. Still further, the installer is provided with an alignment fixture 300 adapted to cooperate with the registration structure of the tube insert 100 to inhibit a relative movement between the alignment fixture 300 and the tube insert 100. The alignment fixture 300 is provided with a plurality of alignment devices 310. Finally, the installer is provided with drill 350 for forming an aperture through the wall of the tube.

If necessary, the installer may first cut the drop tube 200 to the appropriate length depending on the particular application. The tube insert 100 and any associated seal 124 are then disposed at least partially within the end portion of the tube 200, e.g., see FIGS. 6 and 8. In particular, the second end portion 100b of the tube insert 100 is inserted into the end portion of the tube 200 and the tube insert 100 is then further inserted into an interior area of the tube 200 until the transition portion 111 or other portion of the flared portion 108 engages an edge 201 of the tube 200. Although not shown, the outer surface 106 of the drop tube insert 100 may be provided with a shoulder or other stop to provide a predetermined registration between the tube insert 100 and the tube 200. In still further embodiments, no stop is engaged wherein a flared portion 108 of the tube insert 100 is spaced from the edge 201 of the tube 200.

The alignment fixture 300 is then positioned relative to the tube insert 100. In particular, the alignment fixture 300 is positioned relative to the tube insert 100 such that the alignment fixture 300 engages the registration structure of the tube insert 100 to inhibit a relative movement between the alignment fixture 300 and the tube insert 100 and to align the alignment device 310 with respect to the at least one cavity 112 in the wall 102 of the tube insert 100.

In one particular example, the registration structure of the tube insert 100 includes an angular registration structure, wherein the alignment fixture 300 is positioned relative to the tube insert 100 such that the alignment fixture 300 engages the angular registration structure of the tube insert 100 to inhibit a relative angular movement between that alignment fixture 300 and the tube insert 100. In the illustrated embodiment, for example, the tube insert is provided with an angular registration structure comprising a tongue 122 and the alignment fixture is provided with an angular registration structure comprising a slot 306, wherein the alignment fixture 300 is positioned relative to the tube insert 100 by inserting the slot 306 over the tongue 122.

In still further examples, the registration structure of the tube insert 100 includes an axial registration structure, wherein the alignment fixture 300 is positioned relative to the tube insert 100 such that the alignment fixture 300 engages the axial registration structure of the tube insert 100 to inhibit a relative axial movement between that alignment fixture 300 and the tube insert 100. In the illustrated embodiment, for example, the tube insert is provided with an axial registration structure comprising the upper surface 109 of the flared portion 108 and the alignment fixture is provided with an axial registration structure comprising an inner surface 307b of a bridge flange 307, wherein the alignment fixture 300 is positioned relative to the tube insert 100 moving the alignment fixture 300 relative to the tube insert 100 until the inner surface 307b of the bridge flange 307 abuts the upper surface 109 of the flared portion 108.

After the step of positioning the alignment fixture 300 relative to the tube insert 100, the installer uses the view ports 307a, e.g., apertures, to view the relative position of the alignment fixture 300 relative to the tube insert 100. A plurality of view ports 307a are provided and the relative position of the alignment fixture 300 relative to the tube insert 100 is viewed at a plurality of locations, with the plurality of view ports 307a, to ensure a proper relative position between the alignment fixture 300 and the tube insert 100 about the periphery of the alignment fixture 300. Once the alignment fixture 300 is properly aligned with respect to the tube insert 100, the installer clamps the alignment fixture 300 relative to the tube 200 with the adjustable alignment devices 310 such that the alignment fixture 300 is clamped to the tube 200. Adjustment, for example, might involve incremental rotation of each alignment device 310 with respect to the body portion 301 until adequate clamping and centering of the tube 200 with respect to the alignment fixture 300 is achieved. As the tube insert 100 may be axially and angularly registered with respect to the alignment fixture 300 as discussed above, the tube insert 100 may also be effectively coupled to the tube 200 by clamping the alignment fixture 300 to the tube 200.

After clamping the alignment fixture 300 to the tube 200, the installer may form the one or more apertures 208 in the wall 202 of the tube 200 with the drill bit 354 of the drill 350. As shown in FIGS. 7 and 8, the drill bit 354 is inserted within the elongated alignment aperture 313 of each alignment device 310 until the drill bit 354 forms the aperture 208 in the wall 202 of the tube 200. The end of a chuck 352 of the drill 350 may is designed to abut the end of the alignment device 310, as shown in FIGS. 7 and 8, to limit the insertion of the drill bit 354. As shown, the drill bit 354 is capable of following through formation of the aperture 208 by entering the cavity 112 but does not engage the wall 102 of the tube insert 100. In alternative embodiments, a spacing collar may be provided adjacent the chuck to limit insertion of the drill bit.

After forming the apertures 208, the installer may then remove the alignment fixture 300 and crimp a portion 210 of the tube 200 into the cavity 112 as shown in FIG. 1. Such crimping function may be performed with a crimping tool wherein a hammer, such as a mallet, may be used with the crimping tool to crimp portions 210 of the tube 200, adjacent the aperture 208, into the cavity 112.

After crimping, the cavity 112 of the tube insert 100 and the aperture 208 of the tube 200 may be used to secure the tube insert 100 to the tube 200 with a fastener 212. For example, a fastener 212 (see FIG. 1), e.g., screw, rivet or the like, may be inserted into the cavity 112 such that the fastener 212 engages the crimped portion 210 and the cavity 112. It is also contemplated that the fastener 212 may be attached without a crimped portion 210 or the crimped portion 210 may be formed when engaging the fastener 212 with the cavity.

Exemplary embodiments of a liquid communication assembly for a liquid reservoir are disclosed in U.S. Pat. No. 6,523,581, the entire disclosure which is herein incorporated by reference. Many of the features disclosed in U.S. Pat. No. 6,523,581 may be used with the inventive concepts of the present invention. For example, FIGS. 9 and 10 of the present invention depict a liquid communication assembly 500 that incorporates an exemplary apparatus 250 in accordance with the present invention. As shown, the liquid communication assembly 500 includes a spill restrictor 502 and a riser pipe 400 attached to the spill restrictor and having an inwardly facing surface 402. The drop tube 200 is at least partially disposed in the riser pipe 400. As best shown in FIG. 10, an interstitial space 406 is defined between the outer surface 206 of the drop tube wall 202 and the inwardly facing surface 402 of the riser pipe 400. The sealing member 404 engages a restrictor end 408 of the riser pipe 400 and the circumferential sealing surface 110 of the drop tube insert 100. Accordingly, the sealing member 404 provides a sealing connection between the drop tube insert 100 and the riser pipe 400 to inhibit vapor leakage from the interstitial space 406 to the surrounding environment or into the liquid flow path 252. The sealing member 404 may take a variety of shapes to perform a sealing function. In one example, the sealing member comprises an O-ring with an initial circular cross section prior to being compressed. The sealing member 404 can also be preformed substantially to the shape shown in FIG. 10. Still further, the sealing member 404 might have other cross sectional shapes such as a triangular cross sectional shape or the like.

Moreover, as mentioned previously, the sealing member 124 is positioned between the outer surface 106 of the drop tube insert 100 and the inner surface 204 of the drop tube 200 is operative to inhibit fluid communication between the interstitial space 254 and the liquid flow path 254. Moreover, while cavities 112 may be provided in the outer surface 106 of the drop tube insert 100, the cavities 112 do not extend between the inner surface 104 and the outer surface 106 of the drop tube insert 100. Therefore, while cavities 112 may be provided to assist in fastening the drop tube insert 100 to the drop tube 200, the drop tube insert 100 is devoid of any opening extending between its inner and outer surfaces 104, 106 that might otherwise provide a vapor path from the interstitial space 406 to the liquid flow path 252.

Sealing members in accordance with exemplary embodiments of the present invention, may be made from, among other materials, rubber materials such as flourosilicone, flouroelastomer, nitrile or silicone, for example. Suitable materials might include those that exhibit good resistance to fuel attack while also maintaining good rebound characteristics for sealing. Other materials, as would be known to those skilled in the art, may be appropriate.

The foregoing description of the various examples and embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

We claim:

1. An apparatus adapted for use with a riser pipe of a liquid reservoir, comprising:
   a) a drop tube adapted for at least partial disposition in a riser pipe of a liquid reservoir, the drop tube including a wall with inner and outer surfaces;
   b) a drop tube insert at least partially disposed within an end portion of the drop tube, the drop tube insert including a wall with inner and outer surfaces, at least portions of the inner surfaces of the drop tube and drop tube insert cooperating to define a liquid flow path, the wall of the drop tube insert being devoid of any openings and fasteners extending between its inner and outer surfaces;
   c) an interstitial space interposed between at least portions of the outer surface of the drop tube insert and the inner surface of the drop tube;
   d) a fastener extending through the wall of the drop tube and the interstitial space to engage the drop tube insert and to secure the drop tube insert relative to the drop tube; and
   e) a first sealing member positioned between the outer surface of the drop tube insert and the inner surface of the drop tube, the first sealing member being operative to inhibit fluid communication between the interstitial space and the liquid flow path.

2. The apparatus of claim 1, wherein the drop tube insert includes a first end portion and a second end portion, wherein the first end portion is provided with a circumferential sealing surface for a second sealing member and wherein the second end portion is provided with the first sealing member positioned between the outer surface of the second end portion and the inner surface of the drop tube.

3. The apparatus of claim 2, wherein the first end portion comprises a flared portion including the circumferential sealing surface.

4. The apparatus of claim 1, wherein the drop tube insert includes a cavity in the outer surface of the drop tube insert.

5. The apparatus of claim 4, wherein the drop tube includes a crimped portion that extends into the cavity.

6. The apparatus of claim 5, further including a fastener engaging the cavity and the crimped portion.

7. The apparatus of claim 1, wherein the drop tube insert includes a registration structure.

8. The apparatus of claim 7, wherein the registration structure comprises an angular registration structure.

9. The apparatus of claim 7, wherein the registration structure comprises a tongue.

10. The apparatus of claim 1, wherein the wall of the drop tube and the wall of the drop tube insert each comprise a cylindrical wall.

11. A drop tube insert adapted to be at least partially inserted into an interior area of a drop tube, the drop tube insert comprising:
a wall with an inner surface, an outer surface, a first end portion, and a second end portion, wherein the first end portion comprises a flared portion including a circumferential sealing surface for a sealing member, the outer surface includes at least one cavity that is adapted to receive a fastener, and the wall is devoid of any openings and fasteners extending between its inner and outer surfaces.

12. The drop tube insert of claim 11, further comprising a registration structure.

13. The drop tube insert of claim 12, wherein the registration structure comprises an angular registration structure.

14. The drop tube insert of claim 12, wherein the registration structure comprises a tongue.

15. The drop tube insert of claim 11, wherein the wall comprises a cylindrical wall.

16. The drop tube insert of claim 11, wherein the second end portion includes a circumferential groove adapted to receive another sealing member.

17. A liquid communication assembly adapted for use with a liquid reservoir, the assembly comprising:
a) a spill restrictor;
b) a riser pipe including a restrictor end and an inwardly facing surface, wherein the riser pipe is attached to the spill restrictor at the restrictor end;
c) a drop tube at least partially disposed in the riser pipe and including a wall with an inner surface and an outer surface;
d) a drop tube insert at least partially disposed within an end portion of the drop tube, the drop tube insert including a wall with inner and outer surfaces, at least portions of the inner surfaces of the drop tube and drop tube insert cooperating to define a liquid flow path, the wall of the drop tube insert being devoid of any opening and fastener extending between its inner and outer surfaces;
e) an interstitial space interposed between at least portions of the outer surface of the drop tube insert and the inner surface of the drop tube;
f) a fastener extending through the wall of the drop tube and the interstitial space to engage the drop tube insert and to secure the drop tube insert relative to the drop tube;
g) a first sealing member positioned between the outer surface of the drop tube insert and the inner surface of the drop tube, the first sealing member being operative to inhibit fluid communication between the interstitial space and the liquid flow path; and
h) a second sealing member engaging the restrictor end of the riser pipe and a portion of the drop tube insert.

18. The liquid communication assembly of claim 17, wherein the drop tube insert includes a first end portion comprising a flared portion including a circumferential sealing surface that engages the second sealing member.

19. The liquid communication assembly of claim 17, wherein the drop tube insert includes a second end portion comprising a circumferential groove that receives at least a portion of the first sealing member.

20. The liquid communication assembly of claim 17, wherein the wall of the drop tube and the wall of the drop tube insert each comprise a cylindrical wall.

21. The liquid communication assembly of claim 17, wherein the drop tube insert comprises a registration structure.

* * * * *